US007805476B2

(12) United States Patent
Hou

(10) Patent No.: US 7,805,476 B2
(45) **Date of Patent: *Sep. 28, 2010**

(54) EXTENDED HAAR TRANSFORM

(75) Inventor: Hsieh S. Hou, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 1178 days.

This patent is subject to a terminal disclaimer.

(21) Appl. No.: 11/168,981

(22) Filed: Jun. 27, 2005

(65) Prior Publication Data

US 2006/0291735 A1 Dec. 28, 2006

(51) Int. Cl.
*G06F 17/14* (2006.01)

(52) U.S. Cl. ...................................................... 708/400

(58) Field of Classification Search ................ 708/400, 708/401
See application file for complete search history.

(56) References Cited

U.S. PATENT DOCUMENTS 6,466,699 B1 * 10/2002 Schwartz et al. ............ 382/244
6,557,019 B1 * 4/2003 Henderson .................. 708/400
7,640,283 B2 * 12/2009 Hou ........................... 708/400

* cited by examiner

*Primary Examiner*—Chuong D Ngo
(74) *Attorney, Agent, or Firm*—Paul D. Chancellor; Ocean Law

(57) ABSTRACT

A shared lossless Haar transform and an appended Haar transform are combined to form a lossless extended Haar transform in a pipeline architecture for providing fast lossless compressed data that is reversible. The extended Haar transform also provide intrinsic decorrelation for decorrelating corrected randomly generated numbers.

18 Claims, 7 Drawing Sheets

HAAR OUTPUT BUFFER 12
1 2 3 4 5 6 7 8
LATCH D 64
6 1 5 2 3 8 4 7
PU5 66 PU6 68 PU7 69 PU8 70
LATCH E 72
8 1 7 2 3 6 4 5
PU9 74 PU10 76 PU11 78 PU12 80
EXTENDED HAAR OUTPUT BUFFER 82

APPENDED HAAR TRANSFORM

SHARED FORWARD HAAR TRANSFORM

APPENDED DISCRETE COSINE TYPE II TRANSFORM

APPENDED DISCRETE COSINE TYPE IV TRANSFORM

APPENDED HAAR TRANSFORM

PROCESSING UNIT IMPLEMENTATION

BLOCK PROCESSING UNIT

EXTENDED HAAR TRANSFORM

STATEMENT OF GOVERNMENT INTEREST

The invention was made with Government support under contract No. F04701-00-C-0009 by the Department of the Air Force. The Government has certain rights in the invention.

REFERENCE TO RELATED APPLICATION

The present application is one of several related applications, all of which are by the same inventor, Dr. Hsieh Hou: HAAR WAVELET TRANSFORM EMBEDDED LOSSLESS TYPE IV DISCRETE COSINE TRANSFORM, patent application Ser. No. 11/168,977, filed Jun. 27, 2005, now U.S. Pat. No. 7,634,525; SHARED HAAR WAVELET TRANSFORM, patent application Ser. No. 11/168,979, filed Jun. 27, 2005, now U.S. Pat. No. 7,640,283; HAAR WAVELET TRANSFORM EMBEDDED LOSSLESS TYPE II DISCRETE COSINE TRANSFORM, patent application Ser. No. 11/168,978, filed Jun. 27, 2005, now U.S. Pat. No. 7,613,761; EXTENDED HAAR TRANSFORM, patent application Ser. No. 11/168,981, filed Jun. 27, 2005; and COMPRESSED DATA MULTIPLE DESCRIPTION TRANSMISSION AND RESOLUTION CONVERSION SYSTEM, patent application Ser. No. 11/126,705 filed May 10, 2005, now U.S. Pat. No. 7,720,299.

FIELD OF THE INVENTION

The invention relates to the field of discrete cosine transforms. More particularly, the present invention relates to the use of forward Haar transform for use in discrete cosine transforms for data compression.

BACKGROUND OF THE INVENTION

The discrete cosine transform (DCT) does not enable one to directly merge two equal sized transforms into one double size transform, nor to split double size transform in halves. The equal sized splitting and merging is desirable for communicating transformed packets in smaller divisible packets. As such, the DCT is not a true merge and split transformation process. When used to split or merge, a mirror inverse DCT transform does not provide for lossless transformation. The only way for the DCT to perform a merge process is to inversely transform two equal sized DCT transforms back into the time domain, and merge in the time domain, and finally forward transform the combined double size block into a double size DCT transform. This disadvantageously required additional inverse transformations and forward transformations prior to transmission, while degrading the transformed data when additionally inverse and forward again transforming the data, and hence, the DCT is not a true direct split or merge transform. Another problem with the fast discrete cosine transform is that there is no decimation-in-time DCT separate flow process compatible with the DCT decimation-in-time combine flow process. That is, prior DCT processes do not have mirror block and flow processes. In prior art, the T(N/2), type-II DCT and D(N/2) type-IV DCT blocks are DCT transforms of the sum and the difference of two equal sized blocks processing first and second halves of the input data prior to combining the two halves into a double size DCT output. In both forward and inverse DCT transforms, the prior art requires operations on two different types of discrete cosine transforms T(N/2) and D(N/2), which are incompatible with true merge and split transform processing.

Another disadvantage of the prior DCT transforms is that the DCT are processed with integer operations that always incurred large errors in the resulting transformed data that is very lossy, whereas floating-point operations have minimum amount of loss. The term lossy means that the resulting data from transform to inverse transform losses data fidelity. In the content of image compression and decompression, the lossy image would have lower fidelity that the original uncompressed image. There are no completely lossless integer operated type-II or type-IV discrete cosine transforms. Yet another disadvantage in the prior art type-II DCT and type-IV DCT is that the DCTs are implemented with single function. As such, the DCTs do not share resources with other transforms, for example, a Haar transform. A 2×2 rotator, whether lossy or lossless, has two bit-parallel serial word inputs $X_1$ and $X_2$ that are rotated in radians into two outputs $Y_1$ and $Y_2$. The first output of the 2×2 rotator is the first input weighted by the cosine of the rotating angle adding to the second input weighted by the sine of the same rotating angle. The second output of a 2×2 rotator is the first input weighted by the sine of the same rotating angle subtracted from the second input weighted by the cosine of the same rotating angle. That is, $Y_1=\cos\theta X_1+\sin\theta X_2$ and $Y_2=\cos\theta X_1+\sin\theta X_2$. An integer lossy 2×2 rotator has two integer outputs for two integer inputs. An integer lossy 2×2 rotator has been implemented using traditional lifting stages. The unweighted input in each lifting stage is always used for addition but not used for subtraction. Rotators have been used in DCT transforms. Rounding errors cannot be cancelled during continuous use of additions in lifting stages. The total rounding error of the traditional lifting method used in prior arts is very large because the accumulation of rounding errors throughout lifting stages. As such, the use of traditional lifting method produces lossy rotators.

Most linear discrete transforms including DCT, produce non-integer coefficients. The DCT coefficients have to be quantized into integers. The rounding off or quantizing of the DCT coefficients into integers cause information loss that can never be completely recovered by inverse transformations. In many applications, it is often desirable to approximate the original linear DCT with a nonlinear DCT that may produce integer outputs from integer inputs, while retaining the reversibility property of a transform. However, this reversibility still suffers of loss of data fidelity during the transformation and inverse transformation processes. Discrete cosine transforms (DCTs) are widely used by JPEG, MPEG and other international data compression standards to perform lossy compressions on digital image, audio, and video data. These compression methods divide the data into blocks, each of which is first transformed by a linear orthogonal transform, such as, the DCT. The DCT matrix consists of real numbers. The DCT outputs are floating point numbers, and the floating point number have to be quantized in order to convert to integers for transform domain processing. Most of the existing integer discrete cosine transforms are either lossy or unfavorably causing the dynamic range of transform coefficients to increase. There is no lossless integer DCT that still retains the transform fidelity as of the floating point DCT. The quantization process will cause information loss in the inverse transform. The DCT has been used by the current international still-image compression standard JPEG for many years. Yet the international still-image compression standard JPEG2000 has adopted the wavelet transforms. The JPEG2000 does not use the Haar wavelet transform. Also, there is no compatibility between the DCT and JPEG2000 standard wavelet transforms. As such, there are no common processes shared by these two transforms.

The modulated lapped transform is a special form of the cosine-modulated subband filter banks. The modulated lapped transform is also called modified discrete cosine transform in MPEG, the international data compression standards for audio and video data. The modulated lapped transform compression method divides the data into windowed overlapped blocks, each of the overlapped portion is first transformed by a linear orthogonal transform, i.e., the type-IV discrete cosine transform (DCT-IV). The coefficients are quantized into integers. The rounding off or quantizing of the modulated lapped transform coefficients into integers causes information loss that can never be completely recovered by inverse transforms. It is desirable to approximate the original linear modulated lapped transform with a nonlinear modulated lapped transform that may produce integer outputs from integer inputs, while retaining the reversibility property of a transform. The window function and the DCT-IV matrix consist of real numbers. The DCT-IV outputs are floating point numbers that have to be quantized in order to convert to integers. The quantization process causes information loss that may never be recovered in the inverse transform. In many applications, it is desirable to approximate the linear modulated lapped transform with a nonlinear transform that produces integer coefficients from which the original integer data can be reconstructed losslessly. Both the DCT-IV and Haar wavelet transform are exact in floating point operations. However, in many applications the inputs are integer-valued data sequences. These DCT-IV transforms and Haar wavelet transforms are approximated by nonlinear transforms producing integer outputs as close as possible to the true outputs, but still include lossy data. These nonlinear operations may be regarded as a quantization process. But the nonlinear transform is reversible while the quantization is nonreversible.

The random numbers generators are used in many applications. Random numbers produced by digital electronic random number generators are not truly random. The resulting random numbers, especially integer random numbers, either have certain correlations between the generated numbers or have some pseudo periodic structures. Typical examples are the pseudo random sequences found in wireless communications systems. The Haar transform cannot be used to accurately decorrelate the pseudo random sequences for use as a random number generator. The Haar transform has been used for data compression and edge detection in medical images. But, the performance of the regular Haar transform is limited by the lack of sufficient decorrelation power of the Haar transform. These and other disadvantages are solved or reduced using the invention.

SUMMARY OF THE INVENTION

An object of the invention is to provide a system for generating lossless DCT-II transform data.

Another object of the invention is to provide a system for generating lossless DCT-IV transform data.

Yet another object of the invention is to provide a system for generating lossless extended Haar transform data.

Still another object of the invention is to provide a shared Haar transform for use with appended transform for collectively providing lossless DCT-II transform.

Still another object of the invention is to provide a shared Haar transform for use with appended transform for collectively providing lossless DCT-IV transform.

Still another object of the invention is to provide a shared Haar transform for use with appended transform for collectively providing lossless extended Haar transform.

A further object of the invention is to provide an extended Haar transform for decorrelating digitally generated pseudo random numbers.

The invention is directed to forming lossless transforms including DCT-II, DCT-IV, and extended Haar transforms. A shared Haar transform is used as a front-end transform, and an appended transform is used as a back end-transform. The front-end and back-end combine as a complete transform. In the preferred forms, a first aspect is directed to a DCT-II appended transform, a second aspect is directed to a DCT-IV append transform, and a third aspect is directed to an extended Haar transform. All three aspects of the inventions cover the use of the front-end shared Haar transform. The shared Haar transform is also called the Sequential transform or S-transform. The S-transform includes word pair-wise rotators that can be factored into lifting steps.

The first aspect of the invention is directed to a nonlinear discrete cosine transform type-II (DCT-II) that produces integer outputs from which the original integer data can be reconstructed losslessly. The lossless DCT-II is configured as a cascade connection of the front-end shared Haar transform having many word pair-wise rotations and a backend appended DCT-II transform. The integer-to-integer lossless DCT-II and the shared integer-to-integer lossless Haar transform are cascaded. That is, the lossless Haar transform is an integral front-end part of the lossless DCT-II. The shared integrated integer-to-integer lossless Haar transform and appended DCT-II transforms are implemented by using a nonlinear lifting stages for providing accurate floating-point operations. The nonlinear lifting stages are reversible. As such, the resultant DCT-II transform is perfectly lossless during forward and inverse transformations.

The second aspect of the invention is directed to a nonlinear type-IV discrete cosine transform (DCT-IV) that produces integer outputs from which the original integer data can be reconstructed losslessly. The lossless DCT-IV is also configured as a cascade connection of the shared lossless Haar transform. The appended lossless DCT-IV and shared Haar transform are combined to form a lossless DCT-IV transform. The integrated integer-to-integer lossless Haar transform and DCT-IV transform are implemented by using nonlinear lifting stages.

In a third aspect of the invention, the shared Haar transform and an appended Haar transform are combined into an extended Haar transform. The extended Haar transform increases the decorrelation power. The extended Haar transform is a cascade connection of two Haar transforms, the shared and appended Haar transforms. The shared Haar transforms uses fix angular word pair-wise rotations whereas the extended Haar transform uses adaptive angular word pair-wise rotations. Using nonlinear lifting methods, the integer-to-integer extended Haar transform becomes lossless due to the reversibility of the integer-to-integer Haar transform and the adaptive word pair-wise rotations. These and other advantages will become more apparent from the following detailed description of the preferred embodiment.

DETAILED DESCRIPTION OF THE PREFERRED EMBODIMENT

Figure 1:
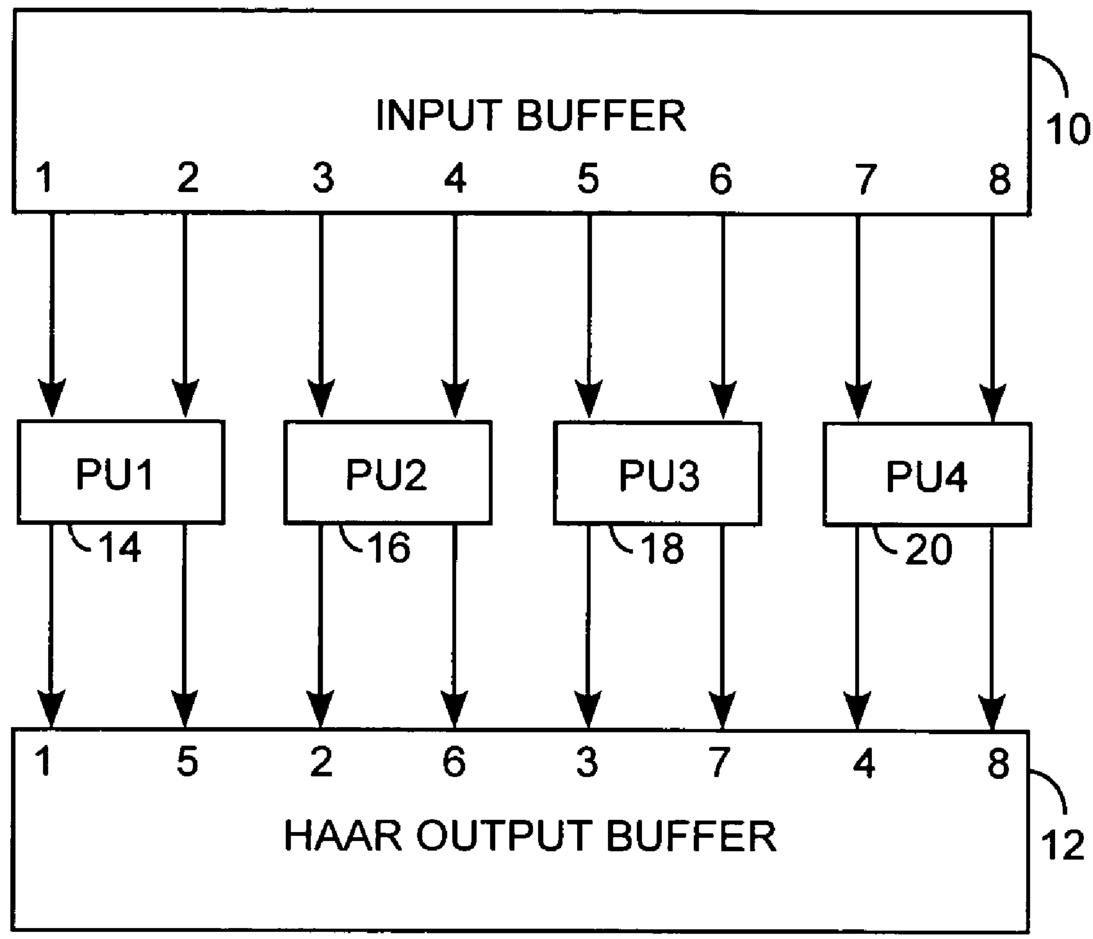
FIG. 1 is a block diagram of a shared forward Haar transform.

An embodiment of the invention is described with reference to the figures using reference designations as shown in the figures. Referring to FIG. 1, an input set of eight integer image data samples from input buffer 10 is passed on to the next processing stage in consecutive word pairs. Input data words one and two are sent to processing unit PU1 14, input data words three and four to processing unit PU2 16, input data five and six to processing unit PU3 18 and input data words seven and eight to processing unit PU4 20. The data input are preferably bit-parallel serial words. The processing units, PU1 14, PU2 16, PU3 18, and PU4 20 are identical lossless 2×2 rotators with a 45 degrees rotating angle, that is, π/4 radians. The rotated outputs of PU1 14 are input words one and five to the Haar output buffer 12. The rotated outputs of PU2 16 are input words two and six to the Haar output buffer 12. The rotated outputs of PU3 18 are input words three and seven to the Haar output buffer 12. The rotated outputs of PU4 20 are input words four and eight to the Haar output buffer 12. The complete circuit is a parallel connection of four word pairs of lossless normalized 2×2 Haar transform, or a parallel connection of a lossless normalized Haar wavelet transforms with eight inputs.

Figure 2A:
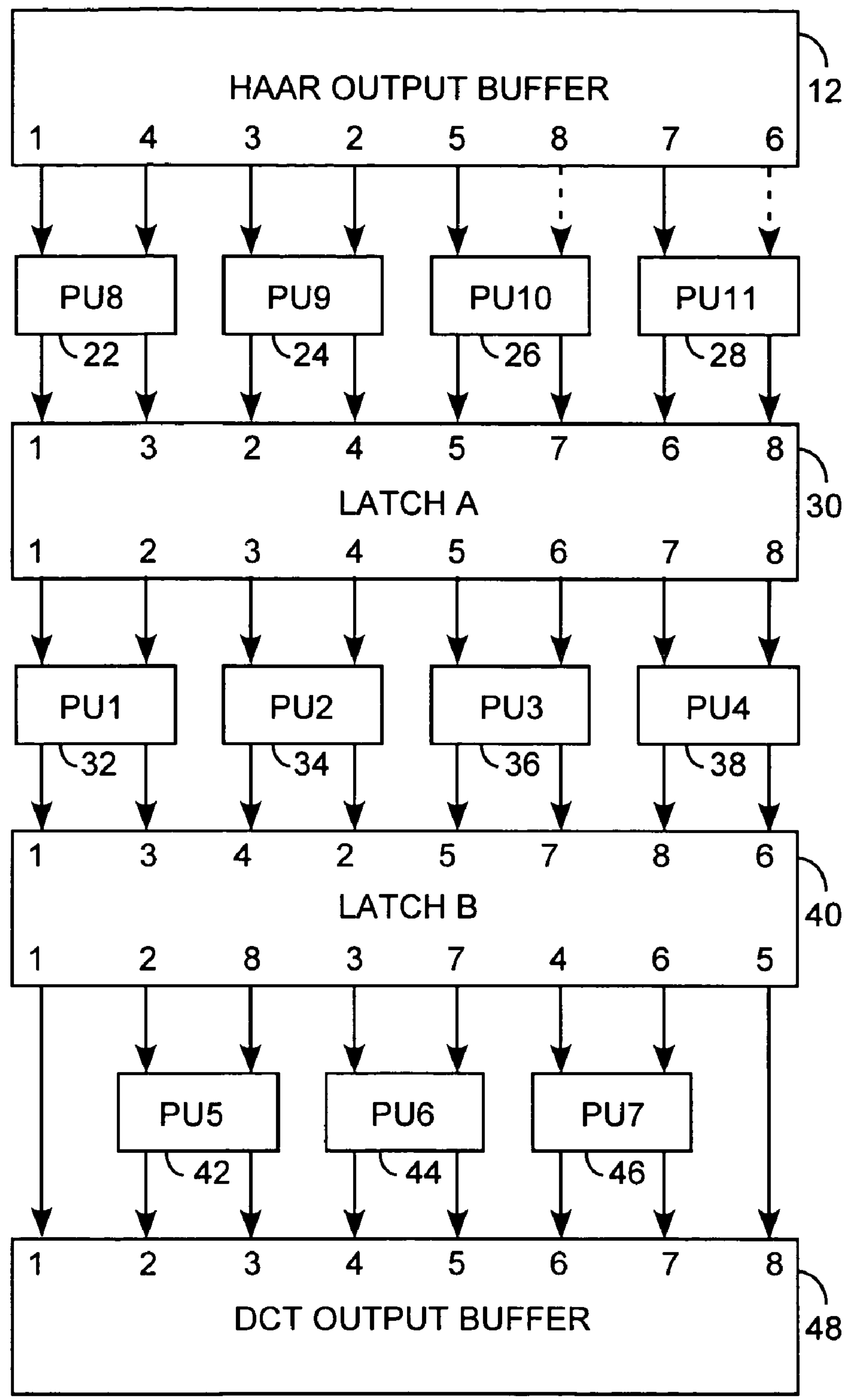
FIG. 2A is a block diagram of an appended discrete cosine type II transform.

Referring to FIG. 2A, the Haar output buffer 12 passes on eight integer output data from the shared forward Haar transform to processing units, PU8 22, PU9 24, PU10 26, and PU11 28 with sign changes on data words six and eight, denoted by dashed lines. The processing units PU8 22, PU9 24, PU10 26, and PU11 28 are identical lossless 2×2 rotators with a rotation of π/4 radians. Simultaneously, input words one and three of latch A 30 latch on the two rotated outputs from PU8 22. The latch A 30 serves to permute input words to latched words by mere wire routing. Input words two and four of latch A 30 latch on the two rotated outputs from PU9 24. Input words five and seven of latch A 30 latch on the rotated outputs from PU10 26. Input words six and eight of latch A 30 latch on the rotated outputs from PU11 28. At the next clock cycle, output words one and two of latch A 30 are sent to processing units PU1 32. Output words three and four of latch A 30 are sent to processing units PU2 34. Output words five and six of latch A 30 are sent to processing units PU3 36. Output words seven and eight of latch A 30 are sent to processing units PU4 38. The processing units PU1 32 and PU3 36 are identical lossless 2×2 rotators, with rotating angle as π/4 radians. Processing units PU2 34 and PU4 38 are identical lossless 2×2 rotators with a rotating angle of π/8 radians. The latch B 40 latches on the rotated outputs of PU1 32, PU2 34, PU3 36, and PU4 38. Output word one of latch B 40 connects directly to input word one of the DCT output buffer 48. Output word five of latch B 40 connects directly to input word eight of the DCT output buffer 48. Output words two and eight of latch B 40 connect directly to the input pairs of processing units PU5 42. Output words three and seven of latch B 40 connect directly to the input pairs of processing units PU6 44. Output words four and six of latch B connect directly to the input pairs of processing units PU7 46. Processing units, PU5 42, PU6 44, and PU7 46 are lossless 2×2 rotators each with a unique rotating angle. The rotating angle of PU5 42 is π/16 radians. The rotating angle of PU6 44 is π/8 radians. The rotating angle of PU7 is 3π/16 radians. The rotated outputs from PU5 42, PU6 44, and PU7 46 are respectively connected to the input word pairs two and three, four and five, and six and seven of the DCT output buffer 48. The latch A 30 and latch B 40 are used for buffering and word permutation. The output data from the DCT output buffer 48 is the lossless DCT-II transformed data.

Figure 2B:
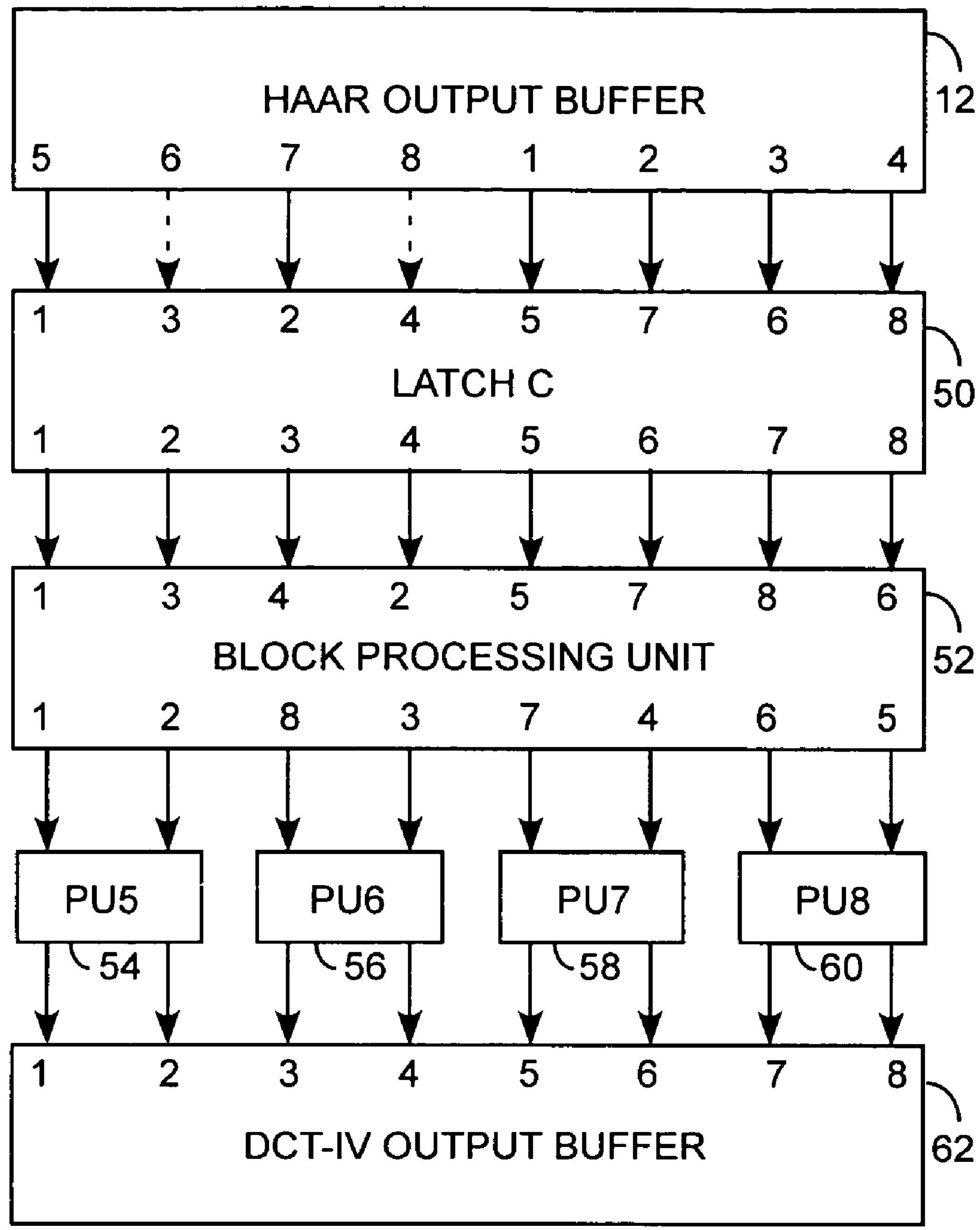
FIG. 2B is a block diagram of an appended discrete type IV cosine transform.

Referring to FIG. 2B, the Haar output buffer 12 passes on eight integer output data from the shared forward Haar transform to latch C 50 with sign changes on data words six and eight, denoted by dashed lines. The latch C 50 is used for permuting and buffering of the shared forward Haar transformed data from the Haar output buffer. The latch outputs are sent to block processing unit 52 for processing with two parallel fourth-order lossless DCT-IV transforms. The DCT-IV transformed outputs from the block processing unit are passed on to processing units, PU5 54, PU6 56, PU7 58, and PU8 60. The processing units PU5 54, PU6 56, PU7 58, and PU8 60 are lossless 2×2 rotators. The rotating angle of PU5 54 is π/32 radians, of PU6 56 is π/16 radians, of PU7 58 is 3π/32 radians, and of PU8 60 is π/8 radians. The outputs from the processing units PU5 54, PU6 56, PU7 58, and PU8 60 are sent to the DCT-IV output buffer 62. The output data in the DCT-IV output buffer is the lossless DCT-IV transformed data.

Figure 2C:
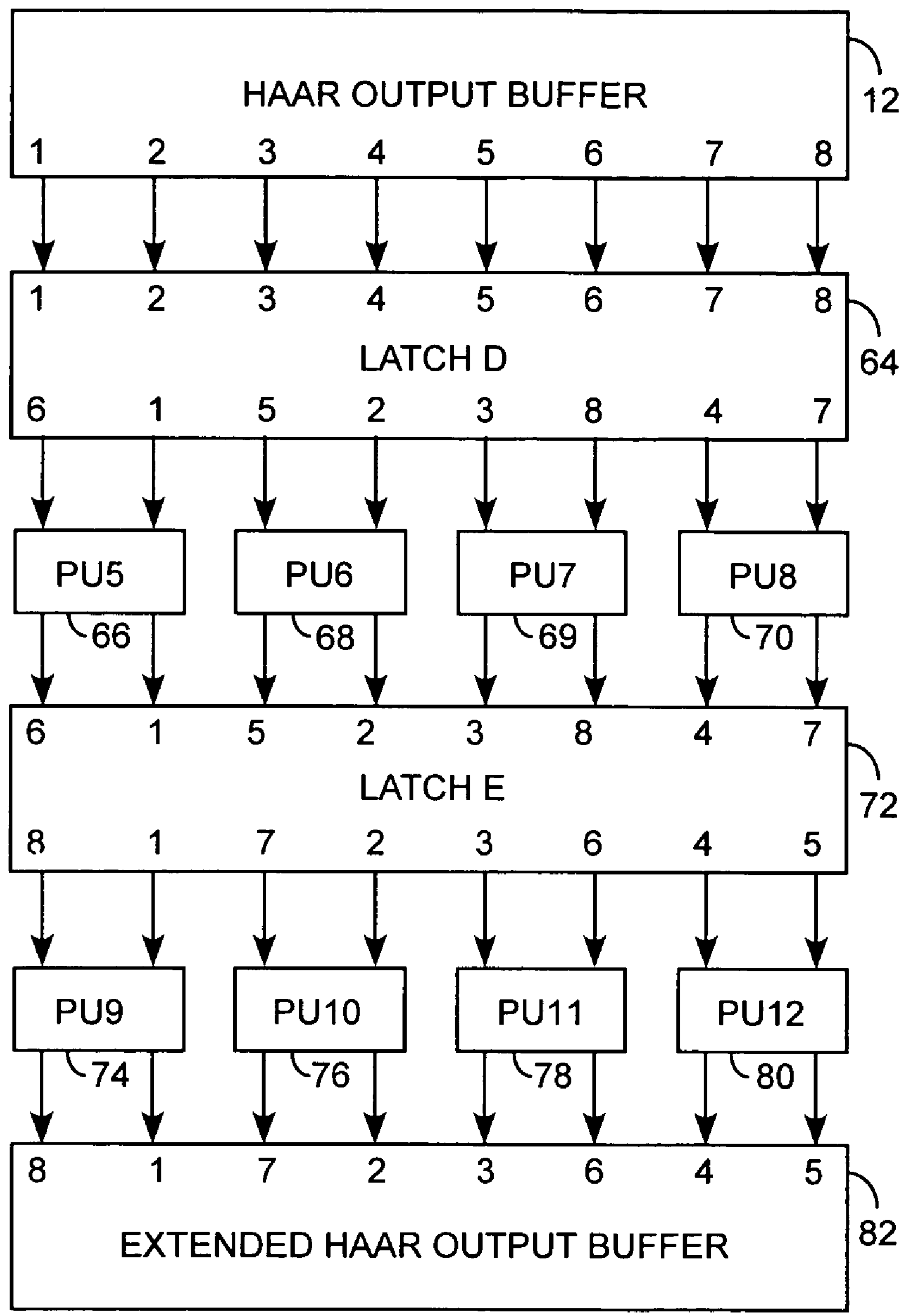
FIG. 2C is a block diagram of an appended Haar transform.

Referring to FIG. 2C, the Haar output buffer 12 passes on eight integer output data from the shared forward Haar transform to processing units, PU5 66, PU6 68, PU7 69, and PU8 70. The processing units PU5 66, PU6 68, PU7 69, and PU8 are identical lossless 2×2 rotators. Each of the rotating angles in PU5 66, PU6 68, PU7 69, and PU8 70 is precalculated from the two inputs. The latch E 72 latches on the rotated outputs from PU5 66, PU6 68, PU7 69, and PU8 70, then sent to processing units PU9 74, PU10 76, PU11 78, and PU12 80 in word pairs. Each of the processing units PU9 74, PU10 76, PU11 78, and PU12 80 has a specific rotating angle that is precalculated from the two inputs. The extended Haar output buffer 82 latches on the rotated outputs of PU9 74, PU10 76, PU11 78, and PU12 80.

Figure 3:
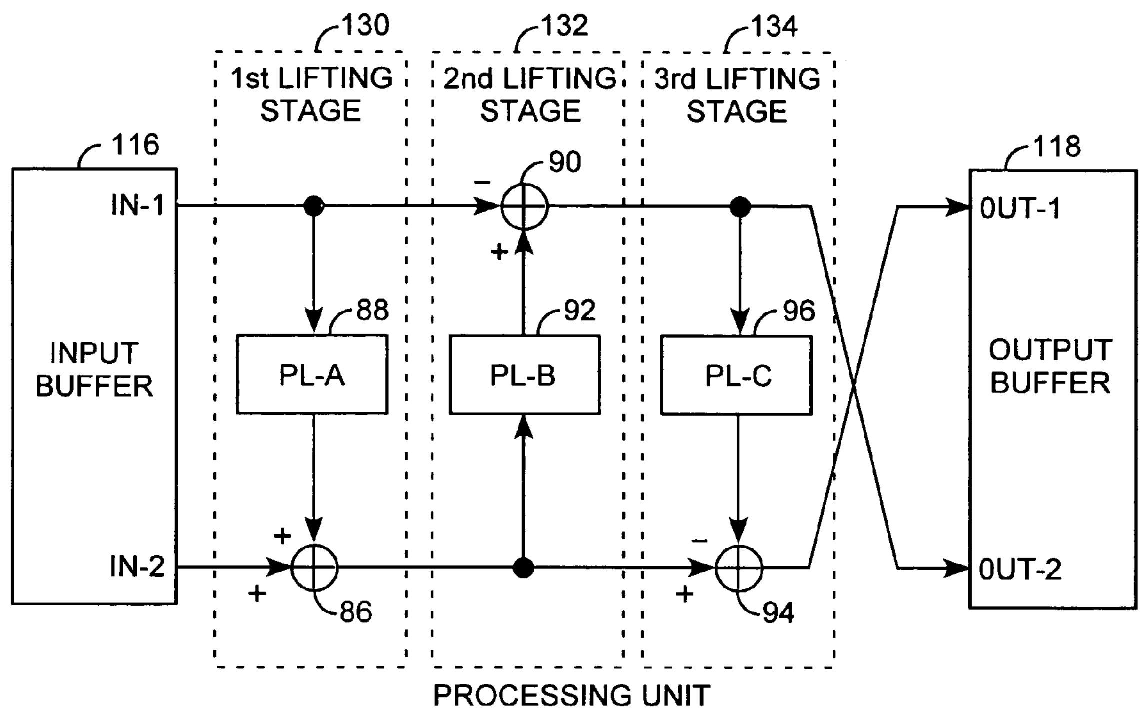
FIG. 3 is a block diagram of a processing unit.

Referring to FIG. 3, a processing unit comprises of three integer-to-integer lifting stages. The integer inputs, IN-1 and IN-2, from the input buffer 116 are fed into the first lifting stage, comprising a processing pipeline unit PL-A 88 and an adder 86. The first input IN-1 to the first lifting stage is weighted by a weighting constant that is one minus the sine of a rotating angle divided by the cosine of the rotating angle at PL-A 88. At adder 86, the second input IN-2 is added to the integer round-off of the weighted output from PL-A 88. The second lifting stage 132 comprises of a processing pipeline unit PL-B 92 and an adder 90. The inputs to the second lifting stage 132 are the outputs from the first lifting stage 130. The first output of the first lifting stage 130 is passed on to adder 90 with a sign change. The second input to the second lifting stage 132 is passed on to the second output of the second lifting stage without change. The second output of the first lifting stage 130 from adder 86 is weighted by a second constant, that is, the cosine of the rotating angle, at PL-B 92. At adder 90, the first output of the first lifting stage 130 is subtracted from the integer round off of the weighted output from PL-B 92. The first output of the second lifting stage 132 is the integer round off of the weighted second input subtracting the first input. The weighting constant is the cosine of the rotating angle. The third lifting stage 134 comprises of a pipeline processing unit PL-C 96 and an adder 94. The inputs to the third lifting stage 134 are the outputs from the second lifting stage 132. The first input of the third lifting stage 134 is passed on to the second output Out-2 of the third lifting stage 134 without change. The first input of the third lifting stage 134 is weighted by a weighting constant that is one minus the sine of the rotating angle divided by the cosine of the rotating angle at PL-C 96. At adder 94, the integer round-off of the PL-C 96 output is subtracted from the second input of the third lifting stage 134. The first output Out-1 of the third lifting stage 134 is the integer output of adder 94. Both outputs Out-1 and Out-2 of the third lifting stage 134 are buffered at output buffer 118.

Figure 4:
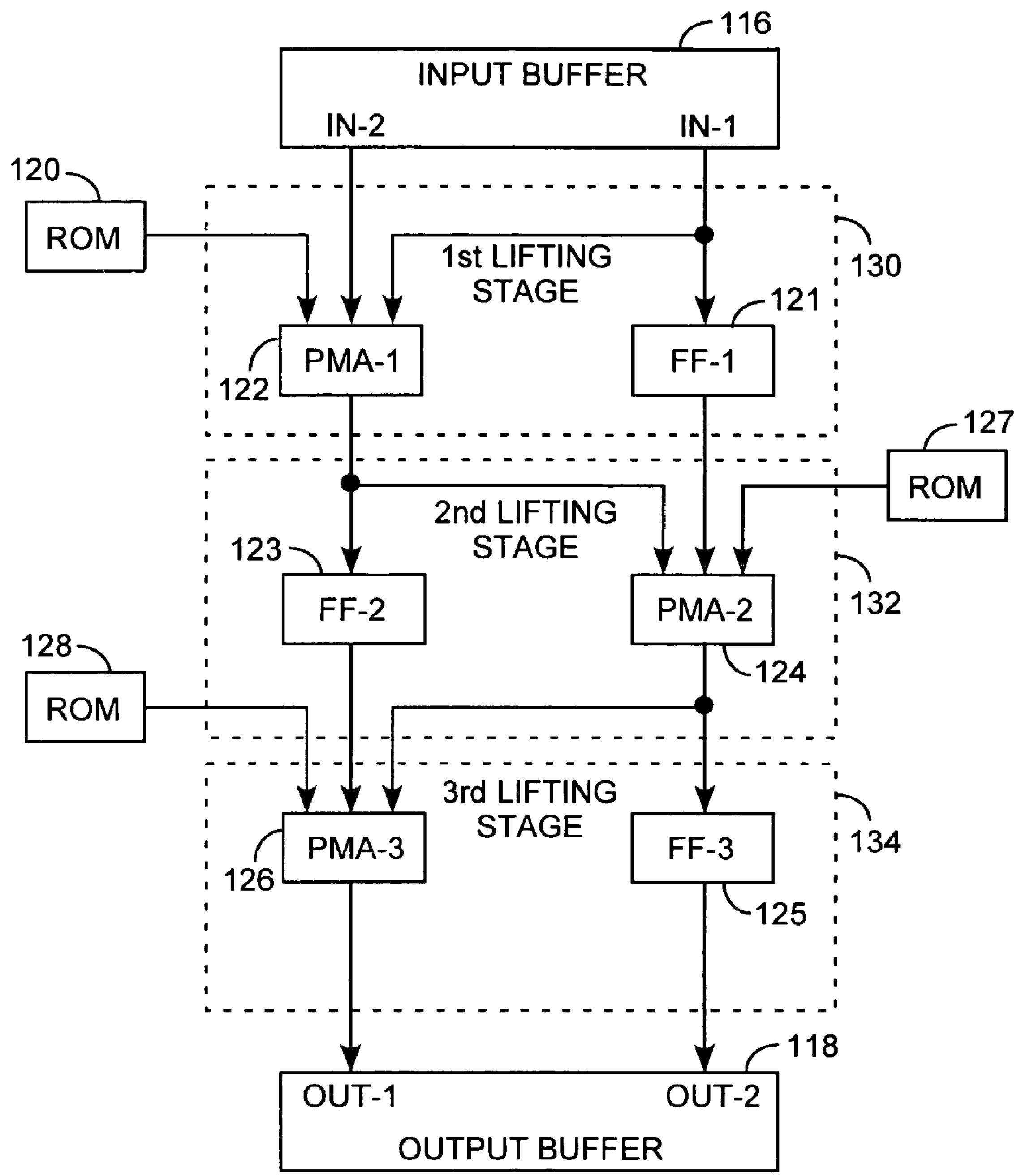
FIG. 4 is a schematic diagram of an implementation of the processing unit.

Referring to FIG. 4, the design of a processing unit is based on a three-stage lifting transform comprising three lifting stages, the first lifting stage 130, the second lifting stage 132, and the third lifting stage 134. The electronic circuit is a parallel pipeline with data flow arranged in word serial and bit parallel format. Three multiplying constants, p, c, and (−p), are respectively stored in read only memory (ROM) 120, ROM 127, and ROM 128 in canonic signed digital codes. The constant c is the cosine of the rotating angle. The constant p is equal to one minus sine of the rotating angle divided by the cosine of the rotating angle. In two's complement, the first input data IN-1 from the input buffer 116 is multiplied to the canonic signed digit codes of p in ROM 120 by the first pipelined multiply-add unit PMA-1 122 in the first lifting stage 130. In the same PMA-1 122 unit the multiplied result is added to the second input data IN-2 from the input buffer 116 in two's complement form. The pipelined multiply-add unit, having many levels of arrays of carry and save adders, and an array of carry look-ahead adders with an output latch at the output end of the pipelined multiply-add unit, performs array multiplications and additions in the same unit. The number of pipelined multiply-add unit levels depends on the bit length of each data involved in multiplication and addition operations. At the same time instant that PMA-1 122 begins processing, the first latch FF-1 121 latches on the first input IN-1. A common data ready signal is used to delatch the PMA-1 122 latch and the FF-1 121 latch, so that both outputs from PMA-1 122 and FF-1 121 can simultaneously flow to the second lifting stage 132. The output from PMA-1 122 is multiplied to the canonic signed digit codes of c in ROM 127 by the second pipelined multiply-add unit PMA-2 124 in the second lifting stage 132. In the same PMA-2 124 unit the multiplied result subtracts the output of FF-1 121 in two's complement form. At the same time instant that PMA-2 124 begins processing, the second latch FF-2 123 latches on the output of PMA-1 123. A common data ready signal is used to delatch the PMA-2 124 latch and the FF-2 123 latch, so that both outputs from PMA-2 124 and FF-2 123 can simultaneously flow to the third lifting stage 134. The output from PMA-2 124 is multiplied to the canonic signed digit codes of (−p) in ROM 128 by the third pipelined multiply-add unit PMA-3 126 in the third lifting stage 134. In the same PMA-3 126 unit the multiplied result is added to the output of FF-2 123 in two's complement form. At the same time instant that PMA-3 126 begins processing, the third latch FF-3 125 latches on the output of PMA-2 124. A common data ready signal is used to delatch the PMA-3 126 latch and the FF-3 125 latch, so that both outputs from PMA-3 126 and FF-3 125 can simultaneously flow to the output buffer 118. The output from PMA-3 126 is the OUT-1 in the output buffer 118. The output from FF-3 125 is the OUT-2 in the output buffer 118.

In the three lifting stages, multipliers are replaced by binary shifts and additions for improved operational speed. Integer arithmetic operations such as additions, subtractions, and shifts of binary numbers are used according to the lifting algorithm to give accurate results for a lossless 2×2 rotation. The implementations of the Haar, extended Haar, DCT-II, and DCT-IV transforms includes the 2×2 rotator, referred to as processing units. A three-stage lifting method is used to reduce the four multiplications in a 2×2 rotator into three multiplications. Thus, a lossless 2×2 rotator for integer inputs comprises of three integer-to-integer lifting stages. In the first lifting stage, the second integer output of the first lifting stage is the second integer input of the lossless 2×2 rotator adding to the integer round-off of the weighted first integer input of the lossless 2×2 rotator. The first integer output of the first lifting stage is the same first integer input of the lossless 2×2 rotator. In the second lifting stage, the first integer output of the second lifting stage is the integer round-off of the weighted second integer output of the first lifting stage subtracting off the first integer output of the first lifting stage. The second integer output of the second lifting stage is the same second integer output of the first lifting stage. In the third lifting stage, the second integer output of the third lifting stage being the first integer output of the lossless 2×2 rotator is the weighted first integer output of the second lifting stage adding to the second integer output of the second lifting stage. The first integer output of the third lifting stage being the second integer output of the lossless 2×2 rotator is the same first integer output of the second lifting stage. The weighting constant in the first lifting stage is one minus the sine of the rotating angle divided by the cosine of the rotating angle. The weighting constant in the second lifting stage is the cosine of the rotating angle. The weighting constant in the third lifting stage is the sine of the rotating angle minus one divided by the cosine of the rotating angle.

Figure 5:
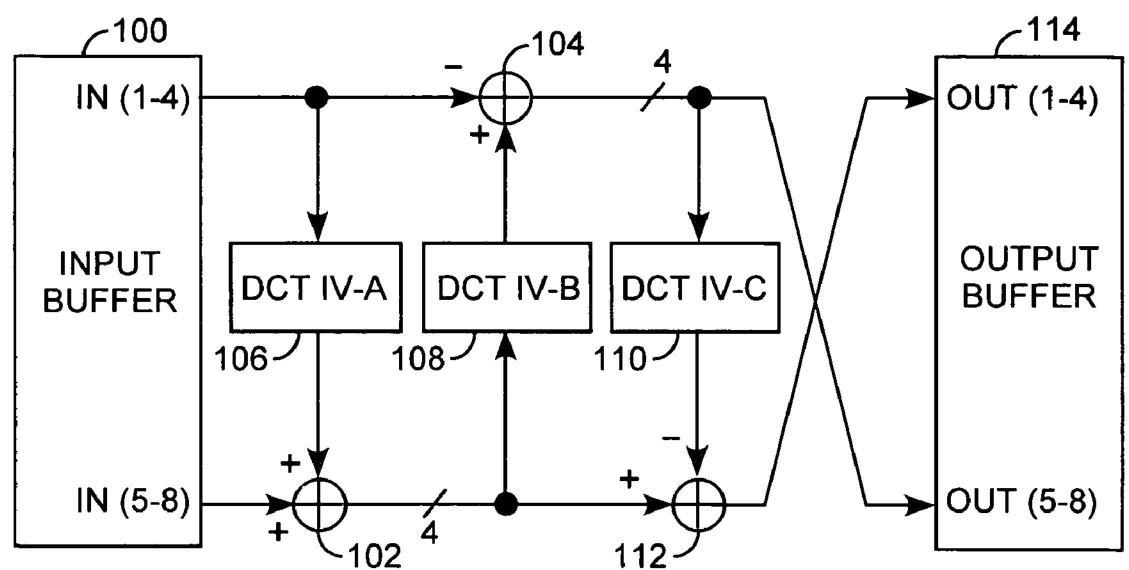
FIG. 5 is a block diagram of a block processing unit for use in the appended discrete cosine type-IV transform.

Referring to FIG. 5, the block processing unit, comprising three integer-to-integer lifting stages, is to perform a 2×2 lossless vector rotation. The vector has four integer data that are processed in parallel. The two sets of integer inputs, IN(1-4) and IN(5-8), from the input buffer 100 are fed into the first lifting stage, comprising a block processing unit DCT-IV-A 106 and an adder 102. The first set of inputs, IN(1-4), is fed into the block processing unit DCT-IV-A 106 for performing a 4×4 DCT-IV transform. The transformed data are rounded off into integers before adding to the second set of inputs IN(5-8) at adder 102. The inputs to the second lifting stage are the outputs from the first lifting stage. The second lifting stage comprises of a block processing unit DCT-IV-B 108 and an adder 104. The first output set of the first lifting stage is passed on to adder 104 with a sign change. The second output set of the first lifting stage is the second input set to the second lifting stage that is passed on to the second output of the second lifting stage without change. The second output set of the first lifting stage is also fed into the block processing unit DCT-IV-B 108 for performing a 4×4 DCT-IV transform. The transformed data are rounded off into integers before subtracting the first output set of the first lifting stage, IN(1-4) at adder 104. The third lifting stage comprises of a block processing unit DCT-IV-C 110 and an adder 112. The inputs to the third lifting stage are the outputs from the second lifting stage. The first input of the third lifting stage is passed on to the second output OUT(1-4) of the third lifting stage without change. The first input of the third lifting stage is also fed into the block processing unit DCT-IV-C 110 for performing a 4×4 DCT-IV transform. The transformed data are rounded off into integers before subtracting from the second output set of the second lifting stage at adder 112. The first output set of the third lifting stage is the integer input set, OUT(1-4), in the output buffer 114. The second output set of the third lifting stage is the integer input set, OUT(5-8), in the output buffer 114.

Referring to all Figures, a radix-2 decimation-in-time DCT algorithm is used to decompose the ordinary DCT into a cascade structure consisting of, as the first part, a Haar wavelet transform and, as the second part, a pair of lower-order DCTs followed by a rotation operation. For example, the eight-order DCT decimation-in-time equation is given by the DCT-DIT equation.

$$z = R_8 \begin{bmatrix} T_4 & 0_4 \\ 0_4 & T_4 \end{bmatrix} I_8^{\#} H_8 x$$

In the DCT-DIT equation, x is the integer input represented by an eight-element vector and z is the integer output also represented by an eight-element vector. $H_8$ is the Haar wavelet transform matrix.

$$H_8 = \frac{1}{\sqrt{2}} \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \end{bmatrix}$$

The shared forward Haar transform can have a parallel implementation. In addition, the matrix $I_8^{\#}$ in the DCT-DIT equation represents a sign change of the output data words six and eight of the Haar output buffer 12.

$$I_8^{\#} = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & -1 & 0 & 0 \\ 0 & 0 & 0 & 0 & 0 & 0 & 1 & 0 \\ 0 & 0 & 0 & 0 & 0 & 0 & 0 & -1 \end{bmatrix}$$

In the DCT-DIT equation, $c_k=\cos(k\pi/16)$ and $s_k=\sin(k\pi/16)$ for k=1, 2, 3, 4. $R_8$ is a rotation matrix referred to as an $R_8$ rotation matrix and $T_4$, the fourth-order DCT matrix.

$$R_8 = \begin{bmatrix} 1 & 0 & 0 & 0 & 0 & 0 & 0 & 0 \\ 0 & c_1 & 0 & 0 & 0 & 0 & 0 & s_1 \\ 0 & 0 & c_2 & 0 & 0 & 0 & s_2 & 0 \\ 0 & 0 & 0 & c_3 & 0 & s_3 & 0 & 0 \\ 0 & 0 & 0 & 0 & 1 & 0 & 0 & 0 \\ 0 & 0 & 0 & -s_3 & 0 & c_3 & 0 & 0 \\ 0 & 0 & -s_2 & 0 & 0 & 0 & c_2 & 0 \\ 0 & -s_1 & 0 & 0 & 0 & 0 & 0 & c_1 \end{bmatrix}$$

$$T_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} c_4 & s_4 & 0 & 0 \\ s_4 & -c_4 & 0 & 0 \\ 0 & 0 & c_2 & s_2 \\ 0 & 0 & s_2 & -c_2 \end{bmatrix} \begin{bmatrix} c_4 & 0 & s_4 & 0 \\ 0 & c_4 & 0 & s_4 \\ s_4 & 0 & -c_4 & 0 \\ 0 & s_4 & 0 & -c_4 \end{bmatrix}$$

-continued $$\begin{bmatrix} 1 & 0 & 0 & 0 \\ 0 & 1 & 0 & 0 \\ 0 & 0 & 0 & 1 \\ 0 & 0 & 1 & 0 \end{bmatrix}$$

Both the DCT and Haar wavelet transforms are exact in floating point operations. However, in many applications the inputs are integer-valued data sequences. It is desirable to approximate the above transforms with nonlinear transforms producing integer outputs as close as possible to the true outputs. This type of nonlinear transform is reversible and is called the lossless lifting method. The lossless lifting method to implement reversible integer transforms is based on factoring the transform matrix into several elementary matrices. But the factoring into elementary matrices in the lossless lifting operations must produce results as accurate as the floating operations. The most accurate factoring of elementary matrix is given by the factorization of the 2×2 rotations, for $p_k=(1-s_k)/c_k$, defined by a $c_k$ matrix.

$$\begin{bmatrix} c_k & s_k \\ -s_k & c_k \end{bmatrix} = \begin{bmatrix} 0 & 1 \\ 1 & 0 \end{bmatrix} \begin{bmatrix} 1 & 0 \\ -p_k & 1 \end{bmatrix} \begin{bmatrix} -1 & c_k \\ 0 & 1 \end{bmatrix} \begin{bmatrix} 1 & 0 \\ p_k & 1 \end{bmatrix}$$

This $c_k$ matrix is equivalent to the nonlinear lifting operations defined by y lifting equations.

$$y_2^{(1)}=y_2^{(0)}+\lfloor p_k y_1^{(0)} \rfloor$$

$$y_1^{(1)}=-y_1^{(0)}+\lfloor c_k y_2^{(1)} \rfloor$$

$$y_2^{(2)}=y_2^{(1)}-\lfloor p_k y_1^{(1)} \rfloor$$

The final values of $y_1$ and $y_2$ are swapped after lifting.

A radix-2 decimation-in-time DCT-IV algorithm is used to decompose the ordinary DCT-IV into a cascade structure consisting of, as the first part, a Haar wavelet transform and, as the second part, a pair of lower-order DCT-IV followed by a rotation operation. The Haar wavelet transform clearly exhibits the subband properties of DCT-IV, while the two lower-order DCT-IV and the rotation operator are to decorrelate the residual correlation between subbands. Without any information loss, the Haar wavelet transform, also called the sequential transform may be implemented by lifting methods. The two lower-order DCT-IV and the rotation operator may further be factored into lifting steps. Finally, using the nonlinear lifting algorithm, the complete DCT-IV can be mapped into an integer-to-integer transform. The nonlinear lifting is reversible, and as such, the resultant DCT-IV is perfectly lossless.

For example, the eight-order DCT-IV decimation-in-time (DIT) equation is given by the DCT-IV-DIT equation.

$$z = R_8 \begin{bmatrix} D_4 & 0_4 \\ 0_4 & D_4 \end{bmatrix} I_8^{\#} H_8 x$$

The term $H_8$ in the DCT-IV-DIT equation is the Haar wavelet transform defined by an $H_8$ transform matrix.

$$H_8 = \frac{1}{\sqrt{2}}\begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \end{bmatrix}$$

In the DCT-IV DIT equation, $c_k=\cos(k\pi/32)$ and $s_k=\sin(k\pi/32)$ for k=1, 2, 3, 4, D4 is the fourth-order DCT-IV matrix, and $R_8$ is an $R_8$ rotation matrix.

$$R_8 = \begin{bmatrix} c_1 & 0 & 0 & 0 & 0 & 0 & 0 & s_1 \\ 0 & c_2 & 0 & 0 & 0 & 0 & s_2 & 0 \\ 0 & 0 & c_3 & 0 & 0 & s_3 & 0 & 0 \\ 0 & 0 & 0 & c_4 & s_4 & 0 & 0 & 0 \\ 0 & 0 & 0 & -s_4 & c_4 & 0 & 0 & 0 \\ 0 & 0 & -s_3 & 0 & 0 & c_3 & 0 & 0 \\ 0 & -s_2 & 0 & 0 & 0 & 0 & c_2 & 0 \\ -s_1 & 0 & 0 & 0 & 0 & 0 & 0 & c_1 \end{bmatrix}$$

Both the DCT-IV and the Haar wavelet transforms are exact in floating point operations. However, in many applications the inputs are integer-valued data sequences. It is desirable to approximate the above transforms with non-linear transforms producing integer outputs as close as possible to the true outputs. This type of non-linear transform is reversible and is called the lossless lifting method. The lossless lifting method to implement reversible integer transforms is based on factoring the transform matrix into several elementary matrices. But the factoring into elementary matrices in the lossless lifting operations must produce results as accurate as the floating operations. The most accurate factoring of elementary matrix is in the form $p_k=(1-s_k)/c_k$, as defined the $c_k$ matrix and the y lifting equations.

The basic operation in the Haar transform, which is also called the Haar wavelet transform, is to perform pair-wise addition and subtraction of two adjacent input pixels. For example, the three lower-order Haar transform matrices are given by the $H_2$, $H_4$, and $H_8$ matrices.

$$H_2 = \frac{1}{\sqrt{2}}\begin{bmatrix} 1 & 1 \\ 1 & -1 \end{bmatrix}$$

$$H_4 = \frac{1}{\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$$

$$H_8 = \frac{1}{\sqrt{2}}\begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \end{bmatrix}$$

The Nth order Haar transform performs (N/2) 2×2 rotations in parallel with all rotating angles as 45 degrees at π/4 radians. The shared forward Haar transform is used to decorrelate two adjacent random variables. In general, for two random variables, $x_1$ and $x_2$, with covariance $\text{cov}(x_1,x_2)$ and variances $\text{var}(x_1)$ and $\text{var}(x_2)$, the 2×2 rotational transform is used to decorrelate the two random variables $x_1$ and $x_2$ according to the 2×2 rotational transform equation.

$$\begin{bmatrix} y_1 \\ y_2 \end{bmatrix} = \begin{bmatrix} \cos\theta & \sin\theta \\ -\sin\theta & \cos\theta \end{bmatrix}\begin{bmatrix} x_1 \\ x_2 \end{bmatrix}$$

The rotating angle in the 2×2 rotational transform equation must satisfy the rotating angle equation.

$$\tan(2\theta) = \frac{2\text{cov}(x_1, x_2)}{\text{var}(x_1) - \text{var}(x_2)}$$

Depending on the second order statistical parameters of the two inputs, the magnitude of the rotating angle varies from 0 to 45 degrees. The rotating angle is 0 when the two random variables are uncorrelated. The rotating angle is 45 degrees at π/4 radians when the two variances of the two random variables are equal. The shared Haar transforms are assuming that the variances of the two input random variables are equal even through that may not be so.

The processing units, PU5 66, PU6 68, PU7 69, and PU8 70 in FIG. 2C are used to further decorrelate the shared Haar transform outputs by removing the correlations between the shared Haar transform output word pairs, (6,1), (5,2), (3,8), and (4,7) from the outputs of latch D 64. Each of the rotating angles of processing units, PU5 66, PU6 68, PU7 69, and PU8 70 is calculated according to the rotating angle equation. The latch E 72 latches on the rotated outputs from PU5 66, PU6 68, PU7 69, and PU8 70. The processing units, PU9 74, PU10 76, PU11 78, and PU12 80 are used to further decorrelate the outputs from the latch E by removing the correlations between the output word pairs (8,1), (7,2), (3,6), and (4,5) from latch E. Each of the rotating angles of processing units, PU9 74, PU10 76, PU11 78, and PU12 80 is calculated according to the rotating angle equation.

A fast lossless extended Haar Transform comprises of three decorrelation layers. The first layer is the shared Haar transform. The second layer comprises of PU5 66, PU6 68, PU7 69, and PU8 70, and latch E 72. The third layer comprises of PU9 74, PU10 76, PU11 78, and PU12 80, and the extended Haar output buffer 82. Each of the three layers is to perform four lossless 2×2 rotations in parallel. The processing chain is expressed by an $E_8$ equation.

$$E_8 = \begin{bmatrix} c_5 & & & & & & & -s_5 \\ & c_6 & & & & & -s_6 & \\ & & c_7 & & & s_7 & & \\ & & & c_8 & s_8 & & & \\ & & & -s_8 & c_8 & & & \\ & & -s_7 & & & c_7 & & \\ & s_6 & & & & & c_6 & \\ s_5 & & & & & & & c_5 \end{bmatrix}$$

-continued $$\begin{bmatrix} c_1 & & & & & & -s_1 & \\ & c_2 & & & & -s_2 & & \\ & & c_3 & & & & & s_3 \\ & & & c_4 & & & s_4 & \\ & s_2 & & & c_2 & & & \\ s_1 & & & & & c_1 & & \\ & & & -s_4 & & & c_4 & \\ & & -s_3 & & & & & c_3 \end{bmatrix} H_8$$

In the $E_8$ equation $c_k$ represents the cosine of the kth rotating angle and $s_k$, the sine of the kth rotating angle.

The shared Haar transform and the rotational transforms in the subsequent two rotation layers are implemented by the lifting method. The lossless lifting method to implement reversible integer transforms is based on factoring the transform matrix into several elementary matrices. But the factoring into elementary matrices in the lossless lifting operations must produce results as accurate as the floating operations. The most accurate factoring of elementary matrix is in the form $p_k=(1-s_k)/c_k$ using the $c_k$ matrix.

$$\begin{bmatrix} c_k & s_k \\ -s_k & c_k \end{bmatrix} = \begin{bmatrix} 0 & 1 \\ 1 & 0 \end{bmatrix}\begin{bmatrix} 1 & 0 \\ -p_k & 1 \end{bmatrix}\begin{bmatrix} -1 & c_k \\ 0 & 1 \end{bmatrix}\begin{bmatrix} 1 & 0 \\ p_k & 1 \end{bmatrix}$$

The factoring of the elementary matrix is equivalent to the nonlinear lifting operations as given by the lifting equations.

$$y_2^{(1)}=y_2^{(0)}+\lfloor p_k y_1^{(0)}\rfloor$$

$$y_1^{(1)}=-y_1^{(0)}+\lfloor c_k y_2^{(1)}\rfloor$$

$$y_2^{(2)}=y_2^{(2)}-\lfloor p_k y_1^{(1)}\rfloor$$

The final values of $y_1$ and $y_2$ are swapped after lifting.

A lossless transform, also called the hybrid orthogonal transform, is generated by applying a fourth-order lossless DCT to the first half of the lossless extended Haar transform output. The relation between the hybrid orthogonal transform $B_8$, the forth-order DCT $T_4$ and the extended Haar transform $E_8$ is given by the hybrid orthogonal transform equation.

$$B_8 = \begin{bmatrix} T_4 & 0_4 \\ 0_4 & I_4 \end{bmatrix} E_8$$

The fourth-order DCT in the hybrid orthogonal transform equation is implemented with two layers of lossless rotations. Each rotational layer comprises of a pair of lossless 2×2 rotators as expressed by the fourth-order DCT matrix.

$$T_4 \begin{bmatrix} 1 & 0 & 0 & 0 \\ 0 & 0 & 1 & 0 \\ 0 & 1 & 0 & 0 \\ 0 & 0 & 0 & 1 \end{bmatrix}\begin{bmatrix} c_4 & s_4 & 0 & 0 \\ s_4 & -c_4 & 0 & 0 \\ 0 & 0 & c_2 & s_2 \\ 0 & 0 & s_2 & -c_2 \end{bmatrix}$$

-continued $$\begin{bmatrix} c_4 & 0 & s_4 & 0 \\ 0 & c_4 & 0 & 0 \\ s_4 & 0 & -c_4 & 0 \\ 0 & s_4 & 0 & -c_4 \end{bmatrix}\begin{bmatrix} 1 & 0 & 0 & 0 \\ 0 & 1 & 0 & 0 \\ 0 & 0 & 0 & 1 \\ 0 & 0 & 1 & 0 \end{bmatrix}$$

In the fourth-order DCT matrix, $c_k=\cos(k\pi/16)$ and $s_k=\sin(k\pi/16)$. The lossless 2×2 rotators in the fourth-order DCT are implemented with integer-to-integer lifting method.

The invention in the first aspect is directed to an integrated lossless type-II DCTs comprising an appended DCT-II transforms and a shared lossless Haar wavelet transform. It should be apparent that the transforms as shown have input and output buffers and communication lines for communicating input data and output data. The transforms are useful in data compression that conserves storage capacities and communication bandwidth such that the invention can be used in computer systems and communication systems. The lossless block transforms, including both appended DCT and Haar wavelet transform, are very effective in prevention of error propagation. Second, the regular structure is quite suitable for VLSI design. Third, the integrated transform is multi-functional, namely, both the DCT and Haar wavelet transform may be integrated in one VLSI design and used for lossless or lossy data compression applications.

In the second aspect of the invention, an integrated lossless DCT-IV and a lossless Haar wavelet transform. There are many advantages for using such architecture. First, the lossless block transforms, including both DCT-IV and Haar wavelet transform, are very effective in prevention of error propagation. Second, the regular structure is quite suitable for VLSI design. Third, the integrated transform is multi-functional, namely, both the DCT-IV and Haar wavelet transform may be integrated in one design and used for lossless or lossy data compression applications.

In the third aspect of the invention, an extended Haar transform and an unitary transform called hybrid orthogonal transform, are constructed in which four low-pass bases belong to the DCT class and four high-pass bases to the Haar Wavelet Transform class. The four low-pass bases can achieve as much energy compaction as the DCT, whereas the high-pass bases have as much spatial localization as the Haar Wavelet Transform. The invention is directed to a combination of transforms having a front-end shared Haar transform and an appended transform that can be a DCT-II, DCT-IV or an extended Haar transform. The transforms can be used separately or in combination to transform, communicate, and store data in processing systems. Those skilled in the art can make enhancements, improvements, and modifications to the invention, and these enhancements, improvements, and modifications may nonetheless fall within the spirit and scope of the following claims.

What is claimed is:

1. A data transformation system including a transform for transforming Haar transform input data into extended Haar transform data, the system useful in computer and communications systems for data compression and error propagation prevention, the system comprising one or more interconnected electronic circuits operative to latch and process digital data, a shared Haar transform implemented at least in part in the electronic circuits for transforming input data into Haar transform input data;

a first latch of the electronic circuits for latching and permuting the Haar transform input data of input data words one, two, three, four, five, six, seven, and eight into first latched words six, one, five, two, three, eight, four and seven, respectively, a first plurality of four process units of the electronic circuits for processing the first latched words, the first plurality of process units being a first set of rotators, a first rotator of the first set of rotators rotating first latched words six and one into first rotated words six and one, a second rotator of the first set of rotators rotating first latched words five and two into first rotated words five and two, a third rotator of the first set of rotators rotating first latched words three and eight into first rotated words three and eight, a fourth rotator of the first set of rotators rotating first latched words four and seven into first rotated words four and seven, a second latch of the electronic circuits for latching and permuting the first rotated words six, one, five, two, three, eight, four, and seven into second latched words eight, one, seven, two, three, six, four, and five, respectively, and a second plurality of four process units of the electronic circuits for processing the second latched words, the second plurality of process units being a second set of rotators, a first rotator of the second set of rotators rotating second latched words eight and one into second rotated words eight and one of the second set of four rotators as words eight and one of the extended Haar transformed data, a second rotator of the second set of rotators rotating second latched words seven and two into second rotated words seven and two of the second set of four rotators as words seven and two of the extended Haar transformed data, a third rotator of the second set of rotators rotating second latched words three and six into second rotated words three and six of the second set of four rotators as words three and six of the extended Haar transformed data, a fourth rotator of the second set of rotators rotating second latched words four and five into second rotated words four and five of the second set of four rotators as words four and five of the extended Haar transformed data.

2. The system of claim 1 wherein, each of the input data words is a sequence of bit-parallel serial words, each of the process units is a 2×2 rotator having two bit-parallel serial word inputs $X_1$ and $X_2$ that are adaptively rotated by a respective angle θ in radians into two bit-parallel serial word outputs, and each of the process units function to compute an angle of rotation where the angle of rotation is adaptive and equal to θ where a tangent of θ is equal to the covariance of the two bit-parallel serial word inputs divided by the of variance of the first input minus the variance of the second input.

3. The system of claim 1 wherein, each of the four first process units is a three stage lifting transform.

4. The system of claim 1 wherein, the Haar transform input data is eight words.

5. A data transformation system for transforming input data into extended Haar transformed data, the system useful in computer and communications systems for data compression and error propagation prevention, the system comprising, one or more interconnected electronic circuits operative to latch and process digital data, the circuits including an input for receiving digital data, a shared Haar transform and a Haar appended transform, the shared Haar transform being different from the Haar appended transform, the shared Haar transform implemented at least in part in the electronic circuits for transforming the input data into Haar transformed data, the Haar appended transform implemented at least in part in the electronic circuits for transforming the Haar transformed data into the extended Haar transform data, the Haar appended transform operable to permute data words one, two, three, four, five, six, seven, and eight into latched words six, one, five, two, three, eight, four and seven respectively, and the extended Haar transform data available at the output and reversible into the input data as lossless transform data when the extended Haar transform data is inversely transformed by the Haar appended transform and the shared Haar transform.

6. The system of claim 5 wherein the Haar appended transform comprises, from a plurality of latches, a first latch for latching and permuting the Haar transform data into first latched data, from a plurality of process units, a first plurality of four process units used as rotators for rotating the first latched data into first processed data, from the plurality of latches, a second latch for latching and permuting the first process data into second latched data, and from the plurality of process units, a second plurality of four process units used as rotators for rotating the second process data into the extended Haar transform data.

7. The system of claim 6 wherein, each of the four first process units and each of the four second process units is a 2×2 rotator.

8. The system of claim 6 wherein, each of the input data words is a sequence of bit-parallel serial words, each of the process units is a 2×2 rotator having two bit-parallel serial word inputs $X_1$ and $X_2$ that are adaptively rotated by a respective angle θ in radians into two bit-parallel serial word outputs, and each of the process units function to compute an angle of rotation where the angle of rotation is adaptive and equal to θ where a tangent of θ is equal to the covariance of the two bit-parallel serial word inputs divided by the variance of the first input minus the variance of the second input.

9. A data transformation system for transforming input data into extended Haar transformed data, the system useful in computer and communications systems for data compression and error propagation prevention, the system comprising, one or more interconnected electronic circuits operative to latch and process digital data, the circuits including an input for receiving digital data, a shared Haar transform implemented at least in part in the electronic circuits for transforming the input data into Haar transformed data, a Haar appended transform implemented at least in part in the electronic circuits for transforming the Haar transformed data into the extended Haar transform data the extended Haar transform data available at the output and reversible into the input data as lossless transform data when the extended Haar transform data is inversely transformed by the Haar appended transform and the shared Haar transform, the Haar appended transform operative to permute data words one, two, three, four, five, six, seven, and eight into latched words six, one, five, two, three, eight, four and seven respectively, the Haar appended transform comprising a plurality of latches, including a first latch for latching and permuting the Haar transform data into first latched data, a plurality of process units, each process unit having a respective rotating angle, from the plurality of process units, a first plurality of four process units used as rotators for rotating the first latched data into first processed data, from the plurality of latches, a second latch for latching and permuting the first process data into second latched data, and from the plurality of process units, a second plurality of four process units used as rotators for rotating the second process data into the extended Haar transform data, and wherein, each of the first plurality of process units and each of the second plurality of process units is a three stage lifting transform, the second stage of each lifting transform operative to weigh its input by the cosine of the respective rotating angle.

10. A data transformation system for transforming input data into extended Haar transformed data, the system useful in computer and communications systems for data compression and error propagation prevention, the system comprising, one or more interconnected electronic circuits operative to latch and process digital data, the circuits including an input for receiving digital data;

a shared Haar transform implemented at least in part in the electronic circuits for transforming the input data into Haar transformed data, a Haar appended transform implemented at least in part in the electronic circuits for transforming the Haar transformed data into the extended Haar transform data, the extended Haar transform data available at the output and reversible into the input data as lossless transform data when the extended Haar transform data is inversely transformed by the Haar appended transform and the shared Haar transform, the Haar appended transform comprising a plurality of latches including a first latch for latching and permuting the Haar transform data into first latched data, a plurality of process units including a first plurality of four process units used as rotators for rotating the first latched data into first processed data, from the plurality of latches, a second latch for latching and permuting the first process data into second latched data, from the plurality of process units, a second plurality of four process units used as rotators for rotating the second process data into the extended Haar transform data, and wherein, each of the first plurality of process units and each of the second plurality of process units is a three stage lifting transform, the Haar transform data words are Haar transform data words one through eight, the extended Haar transform data comprises extended Haar transform data words one to eight, the first latch latches and permutes the Haar transform data words one, two, three, four, five, six, seven, and eight into first latched words six, one, five, two, three, eight, four and seven, respectively, and a second latch latches and permutes the first rotated words six, one, five, two, three, eight, four, and seven into second latched words eight, one, seven, two, three, six, four, and five, respectively.

11. A method for transforming input data representing an image, wherein the input data includes input data words one, two, three, four, five, six, seven, and eight, comprising providing a shared Haar transform for transforming input data into Haar transform input data, the Haar transform implemented at least in part in one or more interconnected electronic circuits, permuting input data words one, two, three, four, five, six, seven, and eight into first latched words six, one, five, two, three, eight, four and seven, respectively, processing the first latched words using first process circuits including a first set of rotators, a first rotator of the first set of rotators rotating first latched words six and one into first rotated words six and one, a second rotator of the first set of rotators rotating first latched words five and two into first rotated words five and two, a third rotator of the first set of rotators rotating first latched words three and eight into first rotated words three and eight, a fourth rotator of the first set of rotators rotating first latched words four and seven into first rotated words four and seven, permuting the first rotated words six, one, five, two, three, eight, four, and seven into second latched words eight, one, seven, two, three, six, four, and five, respectively, and processing the second latched words using second process circuits including a second set of rotators, a first rotator of the second set of rotators rotating second latched words eight and one into second rotated words eight and one of the second set of four rotators as words eight and one of extended Haar transformed data, a second rotator of the second set of rotators rotating second latched words seven and two into second rotated words seven and two of the second set of four rotators as words seven and two of the extended Haar transformed data, a third rotator of the second set of rotators rotating second latched words three and six into second rotated words three and six of the second set of four rotators as words three and six of the extended Haar transformed data, a fourth rotator of the second set of rotators rotating second latched words four and five into second rotated words four and five of the second set of four rotators as words four and five of the extended Haar transformed data.

12. An apparatus for transforming input data representing an image, wherein the input data includes input data words one, two, three, four, five, six, seven, and eight, comprising means for permuting input data words one, two, three, four, five, six, seven, and eight into first latched words six, one, five, two, three, eight, four and seven, respectively, means for processing the first latched words including rotating first latched words six and one into first rotated words six and one, rotators rotating first latched words five and two into first rotated words five and two, rotating first latched words three and eight into first rotated words three and eight, and rotators rotating first latched words four and seven into first rotated words four and seven, means for permuting the first rotated words six, one, five, two, three, eight, four, and seven into second latched words eight, one, seven, two, three, six, four, and five, respectively, means for processing the second latched words including rotating second latched words eight and one into second rotated words eight and one of the second set of four rotators as words eight and one of extended Haar transformed data, rotating second latched words seven and two into second rotated words seven and two of the second set of four rotators as words seven and two of the extended Haar transformed data, rotating second latched words three and six into second rotated words three and six of the second set of four rotators as words three and six of the extended Haar transformed data, and rotating second latched words four and five into second rotated words four and five of the second set of four rotators as words four and five of the extended Haar transformed data, and a shared Haar transform for transforming input data into Haar transform input data implemented at least in part in one or more of the means.

13. A computer readable medium comprising instructions that, if executed, cause a computing device to perform a method comprising providing input data representing an image, transforming the input data into Haar transformed data via a shared Haar transform, transforming the Haar transformed data into extended Haar transform data via a Haar appended transform, including in the Haar appended transform a permutation of data words one, two, three, four, five, six, seven, and eight into latched words six, one, five, two, three, eight, four and seven respectively, and reversing in a lossless transformation the extended Haar transform data into the input data when the extended Haar transform data is inversely transformed by the Haar appended transform and the shared Haar transform.

14. A programmable device that can store, retrieve, and process data and a data transformation system useful for data compression and error propagation prevention implemented in the programmable device, the data transformation system comprising the following components a component executing on a programmable device that implements a shared Haar transform for transforming input data into Haar transformed data, a component executing on the programmable device that implements a Haar appended transform for transforming the Haar transformed data into the extended Haar transform available at an output of the programmable device, the Haar appended transform operable to permute data words one, two, three, four, five, six, seven, and eight into latched words six, one, five, two, three, eight, four and seven respectively, and the extended Haar transform data reversible into the input data as lossless transform data when the extended Haar transform data is inversely transformed by the Haar appended transform and the shared Haar transform.

15. The programmable device of claim 14, wherein the shared transform is useful as a first stage for Haar transforms, DCT Type II transforms, and DCT Type IV transforms.

16. A data transformation system useful in communications systems error propagation prevention, the system comprising a transform for transforming Haar transform input data into extended Haar transform data, one or more coupled electronic devices operative to latch and process digital data, a shared Haar transform implemented at least in part in the electronic devices for transforming input data into Haar transform input data, a first latch of the electronic devices for latching and permuting the Haar transform input data of input data words one, two, three, four, five, six, seven, and eight into first latched words six, one, five, two, three, eight, four and seven, respectively, a first plurality of four process units of the electronic devices for processing the first latched words, the first plurality of process units including a first set of rotators, a second latch of the electronic devices for latching and permuting the first rotated words six, one, five, two, three, eight, four, and seven into second latched words eight, one, seven, two, three, six, four, and five, respectively, and a second plurality of four process units of the electronic devices for processing the second latched words, the second plurality of process units including a second set of rotators.

17. A data transformation system for transforming input data into extended Haar transformed data, the system useful in computer systems for data compression, the system comprising one or more interconnected electronic devices with one or more inputs, the devices operative to latch and process digital data, a shared Haar transform implemented at least in part in the electronic circuits for transforming the input data into Haar transformed data, a Haar appended transform implemented at least in part in the electronic circuits for transforming the Haar transformed data into the extended Haar transform data the extended Haar transform data available at the output and reversible into the input data as lossless transform data when the extended Haar transform data is inversely transformed by the Haar appended transform and the shared Haar transform, the Haar appended transform operative to permute data words one, two, three, four, five, six, seven, and eight into latched words six, one, five, two, three, eight, four and seven respectively, the Haar appended transform comprising a first plurality of process units and a second plurality of process units, wherein, each of the first plurality of process units and each of the second plurality of process units is a three stage lifting transform, and wherein the second stage of each lifting transform is operative to weigh its input by the cosine of the respective rotating angle.

18. A method for transforming input data representing an image comprising providing input data including input data words one, two, three, four, five, six, seven, and eight, providing a shared Haar transform for transforming input data into Haar transform input data, the Haar transform implemented at least in part in one or more interconnected electronic circuits, permuting input data words one, two, three, four, five, six, seven, and eight into first latched words six, one, five, two, three, eight, four and seven, respectively, processing the first latched words using first process devices including a first set of rotators, permuting the first rotated words six, one, five, two, three, eight, four, and seven into second latched words eight, one, seven, two, three, six, four, and five, respectively, and processing the second latched words using second process devices including a second set of rotators.

* * * * *